(12) United States Patent
Bech

(10) Patent No.: US 8,047,798 B2
(45) Date of Patent: Nov. 1, 2011

(54) METHOD OF MANUFACTURING A WIND TURBINE BLADE SHELL MEMBER

(75) Inventor: Anton Bech, Ringkøbing (DK)

(73) Assignee: Vestas Wind Systems A/S, Randers SV (DK)

( * ) Notice: Subject to any disclaimer, the term of this patent is extended or adjusted under 35 U.S.C. 154(b) by 1124 days.

(21) Appl. No.: 11/883,738

(22) PCT Filed: Feb. 3, 2005

(86) PCT No.: PCT/IB2005/050450
§ 371 (c)(1),
(2), (4) Date: Aug. 3, 2007

(87) PCT Pub. No.: WO2006/082479
PCT Pub. Date: Aug. 10, 2006

(65) Prior Publication Data
US 2008/0159871 A1    Jul. 3, 2008

(51) Int. Cl.
*F04D 29/38* (2006.01)
(52) U.S. Cl. ........................................ 416/230
(58) Field of Classification Search .............. 416/229 R, 416/230, 248
See application file for complete search history.

(56) References Cited

U.S. PATENT DOCUMENTS

| | | | |
|---|---|---|---|
| 4,465,537 A * | 8/1984 | Coleman | 416/229 R |
| 4,471,020 A | 9/1984 | McCarthy | |
| 2004/0253114 A1* | 12/2004 | Gunneskov et al. | 416/224 |

FOREIGN PATENT DOCUMENTS

| | | |
|---|---|---|
| EP | 0 037 987 A | 10/1981 |
| WO | WO 03/008800 A1 | 1/2003 |

OTHER PUBLICATIONS

Int'l. Search Report, Oct. 6, 2005.
R. Wachsmuth; Select pages from Aeolus II Report; pp. 77-128; May 1992; MBB Deutsche Aerospace.
R. Wachsmuth; English translation of Rotor Blade of Composite Fiber Design for the Wind Power Installation; Aeolus II, Phase I & II; 21 pages; May 1992; Federal Ministry for Research and Technology.
Cheng-Huat Ong et al; Document entitled The Use of Carbon Fibers in Wind Turbine Blade Design: A Seri-8 Blade Example; Mar. 2000; 78 pages; Stanford, CA.

* cited by examiner

*Primary Examiner* — Richard Edgar
(74) *Attorney, Agent, or Firm* — Wood, Herron & Evans, L.L.P.

(57) ABSTRACT

A method for preparing a wind turbine blade shell member including a plurality of elements of cured fiber-reinforced sheet material is provided. A plurality of elements of cured fiber-reinforced sheet material is provided in a mould, a resin is introduced between the elements of cured fiber-reinforced sheet material and the elements are bonded to adjacent elements by curing the resin. The method is particularly suitable for preparing wind turbine blade shell members due to the complex three-dimensional shape of the airfoils, which may be resembled by the relatively flexible cured fiber-reinforced sheet material.

49 Claims, 5 Drawing Sheets

A)             B)

METHOD OF MANUFACTURING A WIND TURBINE BLADE SHELL MEMBER

TECHNICAL FIELD OF THE INVENTION

The invention relates to wind turbine blade shell members comprising cured fibre-reinforced sheet material. More particularly, the invention relates to a method of manufacturing a wind turbine blade shell member comprising cured fibre-reinforced sheet material near an outer surface, with the cured fibre-reinforced sheet material arranged as partially overlapping tiles.

Furthermore, the invention relates to a wind turbine blade shell member and a wind turbine blade comprising cured fibre-reinforced sheet material bonded by cured resin and a sub-assembly related to the method.

BACKGROUND OF THE INVENTION

WO03/008800 discloses a blade for a wind turbine, which blade comprises a layer of pre-fabricated sticks near the shell surface. In one embodiment, some of the sticks consist of carbon fibre pultrusions positioned in the blade with the cross section of the stick substantially orthogonal to the outer surface of the blade.

OBJECTS OF THE INVENTION

It is the object of the invention to provide a more efficient method of manufacturing a composite member.

It is another object of the invention to provide a composite member comprising cured fibre-reinforced sheet material bonded by cured resin.

DISCLOSURE OF THE INVENTION

The above and other objects of the invention are realised by a method of manufacturing a wind turbine blade shell member comprising the steps of providing a mould, positioning a plurality of elements of cured fibre-reinforced sheet material in the mould. Thereafter, a curable resin is introduced between most of the elements of cured fibre-reinforced sheet material, and the plurality of elements of cured fibre-reinforced sheet material is bonded by curing of the resin An outer surface layer material and/or an inner surface layer material may furthermore optionally be provided in the mould prior to introduction and curing of the resin.

The number of elements may vary considerably dependent on the actual application, such as the thickness, shape and size of the elements, the size of the wind turbine blade shell member to be manufactured. Typically, more at least 3 elements are used, but when more, such as at least 5, at least 10 or at least 15 elements are used, a more even overall shape of the completed reinforcement structure may be achieved. On the other hand, a very high number of elements may be difficult to organise. Even if more layers may be used within the invention, It is therefore typically preferred to use less than 100 elements, such as less than 75 or less than 50 elements. When a large number of elements are used, it is preferred that the elements are arranged in sub-assembly-like structures, such as stacks, which may be temporarily secured to each other form a loose stack.

The use of cured fibre-reinforced sheet material allows for very high fibre content and highly aligned fibres in the elements. It is known in the art that bending or humps of fibres in a fibre-reinforced composite material greatly degrade the mechanical properties, particularly the strength and E-modulus, of the composite. Manufacturing of composites with highly aligned fibres is therefore very desirable. Furthermore, the fact that the sheet is cured facilitates transportation of the elements, as no special conditions, such as temperature range or humidity range, are required. In addition, the combination of the sheet shape with the cured state of the element facilitates adjustment of the elements to the shape of the mould without compromising the alignment, or in other words the straightness, of the fibres in the member. This is particularly important to complex shapes such as an airfoil of wind turbine blade, where the desired fibre distribution is a complicated three-dimensional shape.

According to the invention, at least some of the elements of cured fibre-reinforced sheet material are positioned as partially overlapping tiles so that a number of substantially parallel element edges are provided. This allows for positioning of the elements very close to the surface of the mould, and by adjusting the overlapping area between elements, almost any desired overall distribution of reinforcing fibres may be realized. Particularly, the elements may be positioned in a cross section of a wind turbine blade so that the fibres substantially resemble the distribution of water in a lake having a depth profile corresponding to the distance from the centreline of the blade to the surface of the cross section. In a particularly preferred embodiment, the substantially parallel element edges are edges, which are substantially parallel to the length of the elements of cured fibre-reinforced sheet material. This leads to a relatively short resin introduction distance and hence easier manufacturing and greater reproducibility.

The elements of cured fibre-reinforced sheet material may be provided along a shorter or a larger fraction of the length of the composite structure. However, it is typically preferred that the elements are positioned along at least 75% of the length of the wind turbine blade shell member, and in many cases it is more preferred that the cured fibre-reinforced sheet material is positioned along at least 90% of the length of the composite structure.

The cured fibre-reinforced sheet material comprises fibres, such as carbon fibres, glass fibres, aramid fibres, natural fibres, such as cellulose-based fibre like wood fibres, organic fibres or other fibres, which may be used for reinforcement purposes. In a preferred embodiment, the fibres are unidirectional fibres oriented parallel to the length of the cured fibre-reinforced sheet material. This provides for very high strength and stiffness in the length of the cured fibre-reinforced sheet material. Other orientations or combinations of orientations may be suitable in some applications. Examples of other suitable orientations are bi-axial fibres oriented at ±45° or 0°/90° relative to the length of the sheet material; and triaxial fibres oriented at ±45° and in the length of the sheet material. Such orientations increase the edgewise and/or twisting strength and stiffness of the composite material.

Furthermore, the cured fibre-reinforced sheet material comprises a resin, preferably a thermosetting resin, such as an epoxy-based, a vinyl ester-based resin, a polyurethane-based or another suitable thermosetting resin.

The cured fibre-reinforced sheet material may comprise more than one type of resin and more than one type of fibres. In a preferred embodiment, the cured fibre-reinforced sheet material comprises unidirectional carbon fibres and an epoxy-based resin or a vinyl ester-based resin, preferably the cured fibre-reinforced sheet material consist substantially of unidirectional carbon fibres and an epoxy-based resin.

The cured fibre-reinforced sheet material is a relatively flat member having a length, which is at least ten times the width, and a width, which is at least 5 times the thickness of the sheet material. Typically, the length is 20-50 times the width or more and the width is 20 to 100 times the thickness or more. In a preferred embodiment, the shape of the sheet material is band-like.

It is preferred that the cured fibre-reinforced sheet material is dimensioned such that it is coilable. By coilable is meant that the sheet material may be coiled onto a roll having a diameter that allows for transportation in standard size containers. This greatly reduces the manufacturing cost of the composite member, as endless coils of the cured fibre-reinforced sheet material may be manufactured at a centralised facility and shipped to the blade assembly site, where it may be divided into elements of suitable size. To further enhance shipping, it is preferred that the thickness of the cured fibre-reinforced sheet material is chosen so that the cured fibre-reinforced sheet material may be coiled onto a roll with a diameter of less than 2 m based on the flexibility, stiffness, fibre type and fibre content utilised. Typically, this corresponds to a thickness up to 3.0 mm, however, for high fibre contents and stiffness, a thickness below 2.5 mm is usually more suitable. On the other hand, the thick sheet materials provide for rather large steps at the outer surface, which favours the thinner sheet materials. However, the sheet materials should typically not be thinner than 0.5 mm as a large number of sheets then would be needed leading to increased manufacturing time. Experimental work has shown that a thickness of above 1.0 mm provides a good compromise with regard to the number of sheets. Finally, the flexibility of the cured fibre-reinforced sheet material should be sufficient for sheet to conform to the shape of the mould. In a preferred embodiment, the thickness of the cured fibre-reinforced sheet material is about 1.5 to 2 mm.

The width of the cured fibre-reinforced sheet material typically varies along the length of the sheet material. Typically, the maximum width should be more than 100 mm and to reduce the number of sheets, a width of more than 150 mm is desirable.

Experimental work has shown that in many cases, the width may preferably be more than 200 mm at the widest place. On the other hand, the resin must travel between adjacent sheets in length corresponding to the width of the sheet and hence the maximum width of the sheet material is preferably less than 500 mm to allow for suitable control of resin introduction. In a preferred embodiment, the maximum width is less than 400 mm and for example if the resin is selected so that it initiates curing prior to complete infusion, it is preferred that the maximum sheet width is less than about 300 mm.

In a preferred embodiment of the method according to the invention, the cured fibre-reinforced sheet material is pre-treated before being positioned in the mould. Examples of pre-treatment is sandblasting, e.g. to increase the mechanical binding with the resin or to change the surface texture (see below), rinsing of the surfaces by mechanical and/or chemical means or acclimatising, e.g. drying or heating. More than one type of pre-treatment of the cured fibre-reinforced sheet material may be suitable dependent on the conditions of the use.

The cured fibre-reinforced sheet material should comprise highly aligned fibres and the cured fibre-reinforced sheet material may therefore advantageously be a pultruded cured composite material or a belt pressed cured composite. These techniques may provide the desired sheet shapes with a high fibre content of highly aligned fibres. Furthermore, these techniques are particularly suitable for manufacturing of endless lengths of material.

It may be very difficult to introduce resin between sheets of material if the sheets are positioned very close. This is particularly the case if the space between the sheets are subjected to vacuum. In a preferred embodiment of the invention, the cured fibre-reinforced sheet material is provided with a surface texture to facilitate introduction of resin between adjacent elements of cured fibre-reinforced sheet material. The surface texture may comprise resin protrusions of a height above a main surface of the cured fibre-reinforced sheet material, preferably in the order of about 0.1 mm to 0.5 mm, but larger protrusions may in some cases, such as when the resin introduction distance is relatively large, be larger.

The surface texture may in addition to this or as an alternative comprise recesses, such as channels into the main surface of the cured fibre-reinforced sheet material, preferably the recesses are in the order of 0.1 mm to 0.5 mm below the main surface, but in some cases larger recesses may be suitable. Typically, the protrusions and/or recesses are separated by 1 cm to 2 cm, but the spacing may be wider or smaller dependent on the actual size of the corresponding protrusions and/or recesses.

Surface texture of the types described above may be provided after the manufacturing of the cured fibre-reinforced sheet material, e.g. by sand blasting, grinding or dripping of semi-solid resin onto the surface, but it is preferred that the surface texture to facilitate introduction of resin between adjacent elements of cured fibre-reinforced sheet material at least partially is provided during manufacturing of the cured fibre-reinforced sheet material This is particularly easily made when the cured fibre-reinforced sheet material is manufactured by belt pressing, as the surface texture may be derived via a negative template on or surface texture of the belt of the belt press In another embodiment, a foil is provided between the belt and the fibre-reinforced sheet material being formed in the belt press. Such a foil may also act as a liner and should be removed prior to introduction of the cured fibre-reinforced sheet material in the mould.

In a preferred embodiment, the facilitating effect of surface texture on the resin distribution during resin introduction is realised by providing a plurality of inner spacer elements between adjacent elements of the cured fibre-reinforced sheet material. The inner spacer elements may advantageously be selected from one or more members of the group consisting of a collection of fibres, such as glass fibres and/or carbon fibres, a solid material, such as sand particles, and a high melting point polymer, e.g. as dots or lines of resin. It is preferred that the inner spacer elements are inert during the resin introduction, and for example does not change shape or react with the introduced resin. Using inner spacer elements may be advantageous in many cases, as it is relatively affordable and does not require any particular method of manufacturing of the cured fibre-reinforced sheet material or a special pre-treatment of the cured fibre-reinforced sheet material. The inner spacing elements are preferably in the size range of 0.1 mm to 0.5 mm and separated by typically 1 cm to 2 cm, but both the sizes and the spaces may be suitable in some cases. Typically, the larger the inner spacing element, the larger the spacing can be allowed.

To facilitate the introduction of resin this process may advantageously be vacuum assisted. In this case, the method further comprises the steps of forming a vacuum enclosure around the composite structure. The vacuum enclosure may preferably be formed by providing a flexible second mould part in vacuum tight communication with the mould Thereafter a vacuum may be provided in the vacuum enclosure by a vacuum means, such as a pump in communication with the vacuum enclosure so that the resin may be introduced by a vacuum assisted process, such as vacuum assisted resin transfer moulding, VARTM. A vacuum assisted process is particularly suitable for large structures, such as wind turbine blade shell members, as long resin transportation distances could otherwise lead to premature curing of the resin, which could prevent further infusion of resin. Furthermore, a vacuum assisted process will reduce the amount of air in the wind turbine blade shell member and hence reduce the presence of air in the infused composite, which increases the strength and the reproducibility.

Composite members according to the invention or manufacturable by the method according to the invention may either form a wind turbine blade shell individually or form a wind turbine blade shell when connected to one or more further such composite members, e.g. by mechanical fastening means and/or by adhesive. From such wind turbine blade shells, a wind turbine blade may advantageously be manufactured by connecting two such wind turbine blade shells by adhesive and/or mechanical means, such as by fasteners. Both the wind turbine blade shell and the combined wind turbine blade may optionally comprise further elements, such as controlling elements, lightning conductors, etc. In a particularly preferred embodiment, each blade shell consists of a composite member manufacturable by the method according to the invention. In another preferred embodiment, the wind turbine blade shell member manufactured by the method according to the invention forms substantially the complete outer shell of a wind turbine blade, i.e. a pressure side and a suction side which are formed integrally during manufacturing of the wind turbine blade shell member.

One aspect of the invention concerns a wind turbine blade comprising cured fibre-reinforced sheet material. The cured fibre-reinforced sheet material is positioned near the outer surface of the blade as partially overlapping tiles. In a preferred embodiment the cured fibre-reinforced sheet material is pultruded or band pressed cured fibre-reinforced sheet material and has been divided into elements of cured fibre-reinforced sheet material.

In another preferred embodiment, a wind turbine blade according to the invention has a length of at least 40 m. The ratio of thickness, t, to chord, C, (t/C) is substantially constant for airfoil sections in the range between 75%<r/R<95%, where r is the distance from the blade root and R is the total length of the blade Preferably the constant thickness to chord is realised in the range of 70%<r/R<95%, and more preferably for the range of 66%<r/R<95%. This may be realised for a wind turbine blade according to the invention due to the very dense packing of the fibres in areas of the cross section of the blade, which areas provide a high moment of inertia. Therefore, it is possible according to the invention to achieve the same moment of inertia with less reinforcement material and/or to achieve the same moment of inertia with a more slim profile. This is desirable to save material and to allow for an airfoil design according to aerodynamic requirements rather than according to structural requirements.

BRIEF DESCRIPTION OF THE DRAWINGS

The invention will be explained more fully below with reference to exemplary embodiments as well as the drawings, in which.

All the figures are highly schematic and not necessarily to scale, and they show only parts which are necessary in order to elucidate the invention, other parts being omitted or merely suggested.

DESCRIPTION OF THE DRAWINGS

Figure 1:
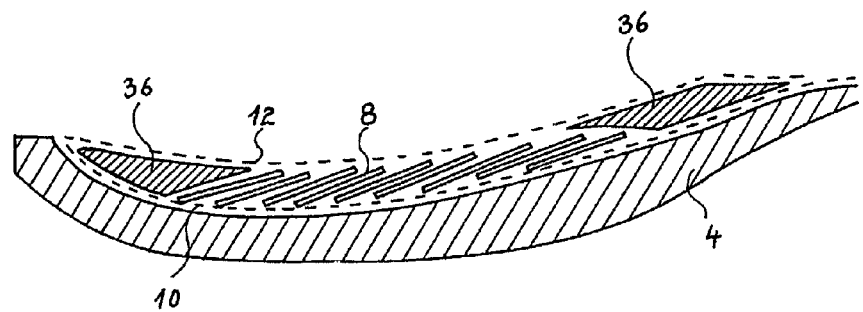
FIG. 1 shows a cross-section wind turbine blade shell member in the mould.

In FIG. 1 an example of a wind turbine blade shell member 2 formed according to the method of the invention is shown in the mould 4. The mould 4 is typically a rigid member and may be combined with a second mould part (see element 5, FIG. 6) during introduction of resin. Typically such second mould part is flexible. Optionally, an outer surface layer material 10 is positioned in the mould. Such an outer surface layer 10 may e.g. be a prepreg or a thermoplastic coating material. Then a plurality of elements 8 of cured fibre-reinforced sheet material is positioned in the mould. Core elements 36, and further elements, such as e.g. a lightning conductor system, a control system and a wind turbine blade monitoring system, may also be provided at this stage.

An optional inner surface layer material 12 may be provided over the elements 8 of cured fibre-reinforced sheet material if this is desired. The optional inner surface layer material may also be provided after introduction of resin between the elements, but the presence of an inner surface layer material is not essential for the wind turbine blade shell member, An inner surface layer material as well as an outer surface layer material may comprise fibres, which are oriented differently from the fibres of the elements of cured fibre-reinforced sheet material and hence e.g. increase the transverse strength of the wind turbine blade shell member.

Finally, resin is introduced between the elements. It is preferred that all the spaces between adjacent elements are filled with the resin, but a partial filling may suffice in some cases. To facilitate introduction of resin, the air between adjacent elements may be removed prior to introduction of resin, e.g. by vacuum as discussed elsewhere.

Figure 2:
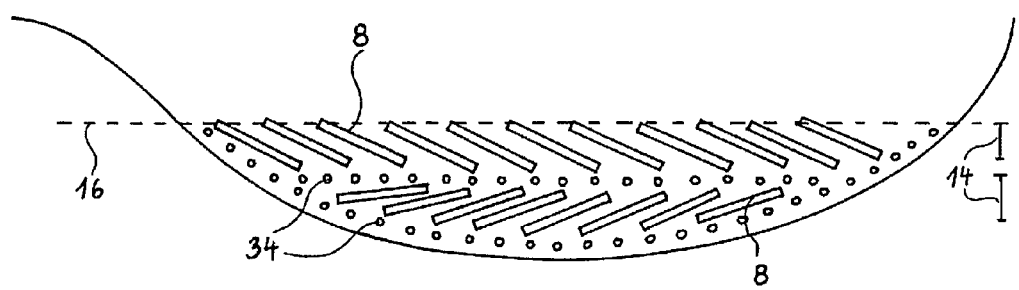
FIG. 2 shows a wind turbine blade shell member having two layers of partially overlapping elements.

In a preferred embodiment exemplified in FIG. 2, the plurality of elements 8 of cured fibre-reinforced sheet material provided as partially overlapping elements are arranged in at least two layers 14 of elements. In FIG. 2, this is exemplified with two layers 14, but more layers such as 3, 4, 5, 6 or even more layers may be advantageous for large wind turbine blade shell members having very thick reinforcement structures. The elements in different layers may be oriented similarly (not shown) or differently as shown in FIG. 2. The layers 14 may be separated by a member 34, such as a fibrous layer or surface spacer element 34 (see below), to facilitate distribution of resin and/or to achieve an even base for a subsequent layer.

Resin may be introduced into the layers of elements in one operation or in a stepwise operation, where one or more layers are first infused by resin upon which the resin in these layers are cured prior to introduction of resin into one or more further layers of elements. Such a stepwise method may comprise two or more steps such as 2, 3, 4, 5 or even more in cases with very thick overall reinforcement structures.

One of the major advantages of the use of elements of cured fibre-reinforced sheet material is that the reinforcement material may be positioned with very high freedom of design. In general, it is preferred that the reinforcement material is positioned as far away from the centreline of the structure as possible to realise a high momentum of the reinforcement. By using overlapping elements, this may substantially be achieved by a plurality of elements having the same shape or—in situations where a complex geometrical overall reinforcement structure is desired—by a plurality of elements having only a few different shapes. This is possible by varying the degree of overlapping and the angles between the outer surface of the composite surface and the elements of cured fibre-reinforced sheet material.

Figure 3:
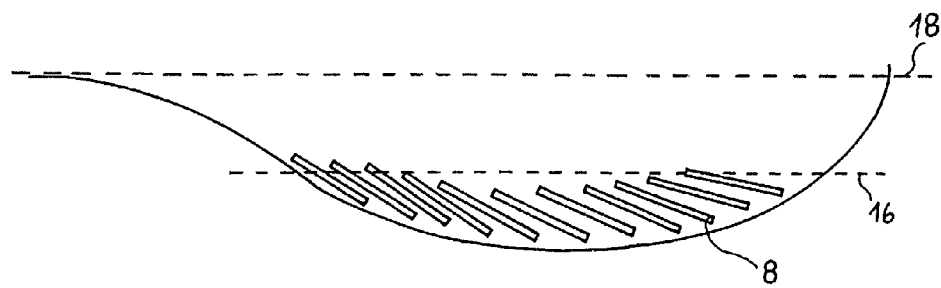
FIG. 3 shows a cross section of a wind turbine blade with reinforcement fibres.

In FIG. 3, an example of a distribution of elements in a mould illustrates this. The elements 8 of cured fibre-reinforced sheet material are positioned along the outer surface, and core elements (not shown) may be arranged away from the outermost surfaces to insure a suitable positioning of the elements. Core elements are light structures with limited reinforcing capability. In a preferred embodiment, this is applied for a wind turbine blade so that at least 80%, preferably 90%, of fibres in a cross section of the blade orthogonal to the longitudinal direction of the blade are arranged in the combined volume of the outermost volume. It is preferred that the above fraction of fibres is arranged in the outmost 20 or 30 vol-% of the pressure or windward side and the outermost 20 or 30 vol-% of the suction or leeward side. For the semi-profile in FIG. 3, the fraction of the outermost part is indicated with line 16 and the centre plane of the profile is indicated with line 18. This arrangement is highly desirable, as it allows for increased moment of inertia for a given amount of reinforcement. In a preferred embodiment, this distribution of fibres is realised for cross sections in the range of ratios of distance from wind turbine blade root, r, to the total length of the wind turbine blade root, R, of 50%<r/R<75%, preferably for cross sections in the range between 25%<r/R<75%. In a highly preferable embodiment, the fibres are carbon fibres.

The elements of cured fibre-reinforced sheet material may advantageously be prepared by dividing the cured fibre-reinforced sheet material by cutting. Due to the fibrous nature of the cured fibre-reinforced sheet material it is preferred to use water jet to prevent dependency on wear of traditional cutting tools, but other methods may also be used within the scope of the invention.

Figure 5:
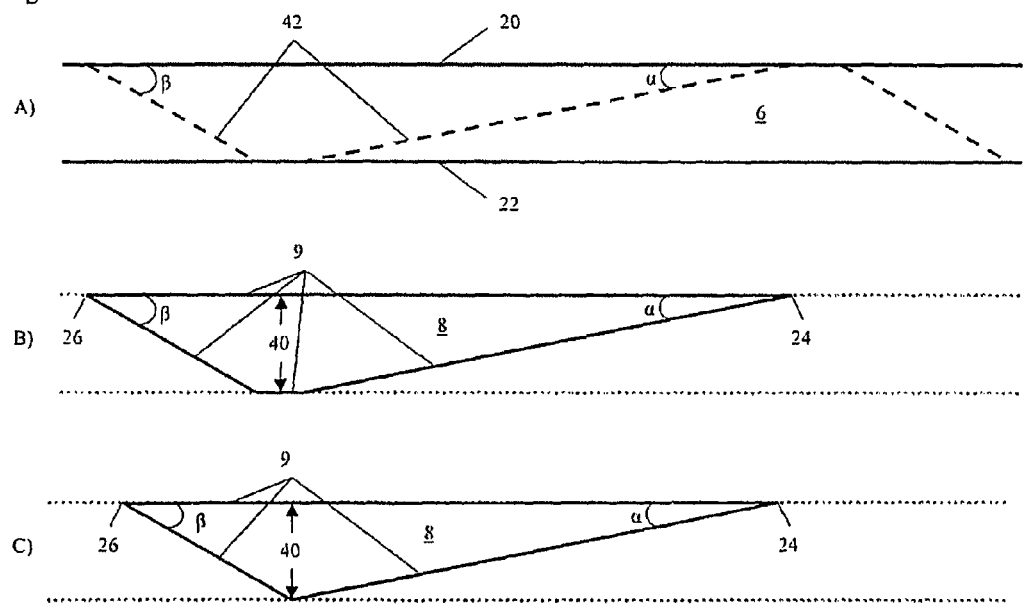
FIG. 5 shows a preferred method of preparing an element sub-assembly by dividing cured fibre-reinforced sheet material.

In FIG. 5, an example of a method of dividing a band-shaped cured fibre-reinforced sheet material is described. It is desirable to shape the elements so that a relatively sharp tip is formed near at least one end, as a stack of partially overlapping elements will then resemble an overall chamfering of the reinforcement fibre content towards the end. This is particularly the case if the tip of the element is formed by the intercept of two relatively straight edges.

In a preferred embodiment shown in FIG. 5A, at least one of the elements 8 of the cured fibre-reinforced sheet material 6 is divided to form a first tip angle $\alpha$ towards a first end 24 corresponding to a first end of the wind turbine blade shell member 2. In a more preferred embodiment, the first tip angle $\alpha$ and one edge 9 of the elements 8 are formed by dividing the cured fibre-reinforced sheet material 6 along a straight line indicated in FIG. 5A by a broken line 42 from a first sheet edge 20 to the second sheet edge 22 of the cured fibre-reinforced sheet material 6. For elongated composite structures, which are supported near one end only such as a wind turbine blade, the momentum increases substantially linearly from the unsupported end towards the supported end. The strength of the elements is substantially proportional to the cross section of the element, and the elements typically account for the major part of the structural strength. It is therefore highly advantageous that the cross section of the sum of element (also referred to as the overall reinforcement structure) increases substantially linearly from the first tip end. According to the invention, this may easily be realized by utilizing individual elements with a first tip angle $\alpha$, which are formed by dividing the cured fibre-reinforced sheet material along a straight line as discussed above.

Another preferred embodiment is also shown in FIG. 5A. Here, at least one of the elements 8 of the cured fibre-reinforced sheet material 6 is divided to form a second tip angle $\beta$ towards a second end 26 corresponding to a second end of the wind turbine blade shell member 2 In a more preferred embodiment, the second tip angle $\beta$ and another edge 9 of the element 8 are formed by dividing the cured fibre-reinforced sheet material 6 along a straight line indicated in FIG. 5A by a broken line 42 from a first sheet edge 20 to the second sheetedge 22 of the cured fibre-reinforced sheet material 6. Particularly for elements or sub-assemblies 8 to be applied for manufacturing of a wind turbine blade, it is preferred that the second tip angle $\beta$ is larger than the first tip angle $\alpha$.

To save cured fibre-reinforced sheet material by avoiding or at least reducing waste, it is preferred that the width of a part of the element or sub-assembly 8 of the cured fibre reinforcement material 6 corresponds to the width of the cured fibre-reinforced sheet material.

The element or sub-assembly 8 in FIG. 5 is further advantageous in that identical elements may be formed with no part of the cured fibre-reinforced sheet material being wasted during dividing of the cured fibre-reinforced sheet material. The lack of waste may be realised for trapezium-shaped elements (shown in FIG. 5B) as well as triangular elements (shown in FIG. 5C) with a height corresponding to a width 40 of the cured fibre-reinforced sheet material.

The element 8 is a sub-assembly for the manufacturing of wind turbine blade shell members according to the invention and may be manufactured on-site in close relation to the lay-up and manufacturing of the complete wind turbine blade shell member or the sub-assembly may be manufactured separated from the manufacturing site of the composite structure. The sub-assembly may comprise one or more of the features, which have been described for the elements or for the cured fibre-reinforced sheet material, such as material content, a modified surface texture, an inner surface spacer element secured thereto, method of manufacture, shape and size and thickness under the same considerations. The sub-assembly may be transported in a stack of flat elements or coiled or bent into a suitable shape. The element sub-assemblies may be integrated into a further sub-assembly comprising a stack of sub-assemblies and optionally further elements, such as adhesive or mechanical fasteners to hold the elements together at least temporarily. Both types of sub-assemblies may advantageously be used for the manufacturing of wind turbine blade shell members as the flexibility of the sub-assembly suits the requirements to form the three dimensional shape of the blade air foil.

The elements of cured fibre-reinforced sheet material may be arranged to form a reinforcement structure in various overall shapes. Typically, the elements are arranged so as to form a reinforcement structure having one leg towards the first end of the wind turbine blade shell member to be manufactured and one leg towards the second end of the composite structure, as illustrated in FIG. 4A. However, in a preferred embodiment, the elements 8 of the cured fibre-reinforced sheet material 6 are positioned in the mould 4 so as to form an overall reinforcement structure, which has at least two legs towards the first end 24 corresponding to a first end of the wind turbine blade shell member and/or at least two legs towards the second end 26 corresponding to a second end of the composite structure.

Figure 4:
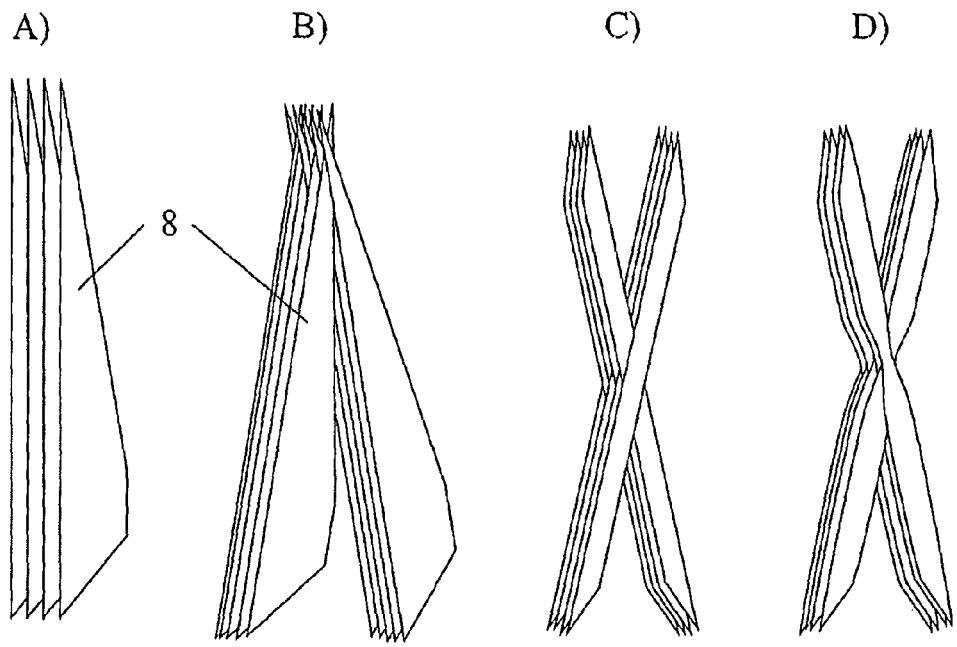
FIG. 4 shows various overall reinforcement structures.

FIG. 4B to D illustrate examples of reinforcement structures having more than one leg towards at least one end. In FIG. 4B, the overall reinforcement structure has one leg towards the first end and two legs towards the second end In FIGS. 4C and D, the overall reinforcement structure has two legs towards the first and the second ends. The overall reinforcement structures illustrated in FIG. 4 are particularly advantageous in that—in addition to provide tensile strength—the reinforcement structures provide increased twisting strength and stiffness and/or edgewise strength and stiffness. This is particularly advantageous for long relatively slim structures, such as wind turbine blades and wind turbine blade shell members.

If the elements of different legs overlap in one or more areas, it is preferred that the elements of the legs are interlaced to realise an increased connection between the elements of the individual legs. Such interlacing are particularly easy to realise for wind turbine blade shell members having elements of cured fibre-reinforced sheet material since the individual elements may be handled without bending the fibres in the elements, The overall reinforcement structure tends to become very thick in areas where elements of individual legs overlap. This may lead to local bending of the fibres in the elements or inappropriately high resin use in areas adjacent to such overlapping areas to prevent the local bending. FIG. 4D shows a reinforcement structure having a special embodiment of the elements of cured fibre-reinforced sheet material. The elements are provided with an area corresponding at least partially to the overlapping area, which has a reduced width. Thereby the total thickness of the reinforcement structure in these areas is reduced. In another embodiment, the elements are provided with an area corresponding at least partially to the overlapping area, which has a reduced thickness (not shown in the figures). In general, the embodiment with the reduced width is more preferred, since such elements may easily be prepared by cutting a coil of cured fibre-reinforced sheet material.

The exact positioning of the elements of cured fibre-reinforced sheet material in the mould may be facilitated by the use of a template means 30 showing the desired positions. This is particularly the case when more complex systems of elements are desired or if manual lay-up is utilized. A template means may indicate the relative position of elements of cured fibre-reinforced sheet material towards an end corresponding to the end of the wind turbine blade shell member and/or indicate the relative position of at least one element relative to the mould, such as a mould edge or a feature of the mould, e.g. a hole or a tap. The indication of the correct position may involve the longitudinal position, the widthwise position and/or the height-wise position relative to the mould and/or relative to further elements of cured fibre-reinforced sheet material or other elements to be included in the composite structure.

The template means 30 may be integrated in the wind turbine blade shell member so that it is a single use template. In a preferred embodiment, the template means 30 is integrated with a core element 36 of the composite structure.

For large elements, such as for a wind turbine blade, where the length of the elements of cured fibre-reinforced sheet material typically is in the order of the total length of the wind turbine blade, it may be advantageous to apply several template means, e.g. one at each end and 1, 2, 3 or more on selected positions along the length of the blade.

The elements of cured fibre-reinforced sheet material are bonded together by resin as discussed above, but during the lay-up, it is highly advantageous to at least temporarily fix the elements of cured fibre-reinforced sheet material to the mould and/or to another element in the mould, e.g. one or more cured fibre-reinforced sheet material element or another type of element. The temporary fixing should be formed so that the fixing does not lead to unacceptable defects during subsequent introduction of resin or during use of the final product. The fixing may for example involve one or more adhesive, such as a curable or non-curable hot-melt resin or a double-coated tape; or mechanical fastening means, such as a clamp, wires, wires with loops or an elastic member. In a particularly preferred embodiment, the means for temporary fixing are not removed prior to introduction of resin and hence included in the completed composite structure. In this case, it is particularly important that the means for temporary fixing is compatible with the elements of the final structure in both chemical terms (e.g. in relation to the resin) and mechanical terms (e.g. no formation of mechanically weak spots).

In a preferred embodiment, the elements of cured fibre-reinforced sheet material are positioned according to two to four, preferably three, templates positioned near the ends and away from the ends. The elements are temporarily fixed in the desired positions by hot melt, which is of the same type as the resin to be introduced to bond the elements and the templates are removed prior to resin introduction.

Figure 6:
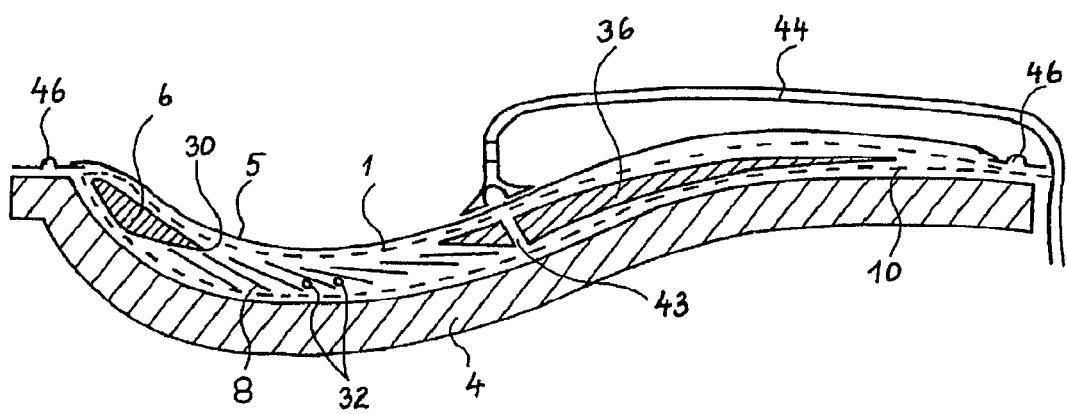
FIG. 6 shows preferred resin transportation routes during introduction of resin.
Figure 7:
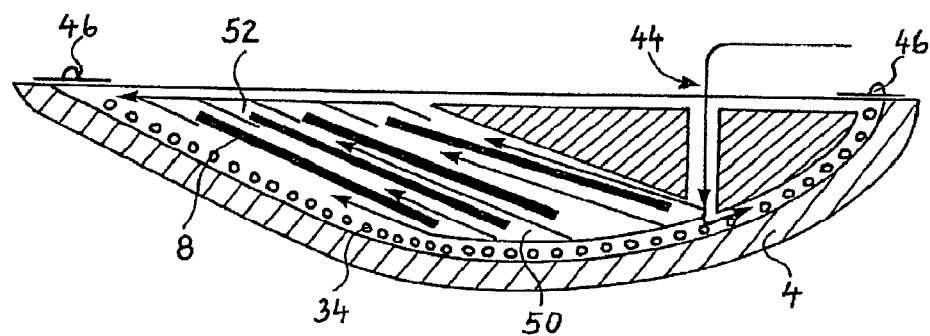
FIG. 7 shows details of resin transportation routes of FIG. 6

For a curved mould, such as a cross section of a mould for a wind turbine blade shell member as shown in FIG. 6 and FIG. 7, the resin may advantageously be introduced between the elements from the convex side. As the rigid mould 4 typically is convex, this typically leads to resin being introduced through the rigid mould 4 or through the second flexible mould 5 and through the wind turbine blade shell member to near the outer surface. This is mainly due to the spacing between the elements being greater at the convex side than at a concave side as indicated in FIG. 7 by arrows 50 and 52, respectively. FIG. 6 shows a preferred route of introducing the resin. Here, the resin is introduced through the second mould 5 via a resin inlet 44 and a resin passage 43 in a core element 36 to near the outer mould but other resin transport routes are also feasible. From near the mould surface, the resin is introduced between the elements 8. In addition to larger access to the space between the elements 8, the introduction of resin from near the mould surface towards the second mould allows for observation of complete resin introduction during processing as the resin must penetrate to the surface of the wind turbine blade shell member near the second mould. Additionally, the facilitating effect of surface texture on the resin distribution during resin introduction is realized by providing a plurality of inner spacer elements 32 between adjacent elements of the cured fibre-reinforced sheet material. Here, the resin may be observed visually, particularly if the second mould part is transparent or transparent windows are provided in the second mould part.

In a particularly advantageous arrangement of the structural elements of the mould and the composite to be manufactured shown in FIG. 6, the elements 8 of cured fibre-reinforced sheet material are arranged partially overlapping starting from a first side of the mould, e.g. corresponding to leading edge or trailing edge of a wind turbine blade shell member. The resin introduction passage is arranged near the element 8 of cured fibre-reinforced sheet material away from the first side of the mould, e.g. corresponding to trailing edge or leading edge, respectively. Excess resin may advantageously be extracted near the first side of the mould near the surface of the second mould (e.g., at resin outlet 46), corresponding to the leading edge or the trailing edge, respectively. Such an arrangement allows for a relatively straight resin transport, which reduces the likelihood of blocking of the resin distribution route and therefore provides a more robust design.

The elements 8 are relatively flexible in directions orthogonal to the plane of the element 8 and therefore conform to the inner surface of the mould 4 by flexing. However, the elements 8 are also relatively rigid in directions in the plane of the element 8 and therefore tend to form sharp lines of connection to the mould. Such connections dramatically detain the resin transport transversely to the connection.

It is known to provide flexible open webs near the surface of a composite structure to facilitate resin infusion. However, such flexible webs would be substantially without effect when the elements are relatively rigid as in this case, as flexible webs simply would be deformed by the high local pressure exercised by the edge of the elements 8. The inventor has realised that in such cases, the surface spacer element 34 should also be rigid. Experimental work has shown that a composite material having an open structure, such as a grid or a grill, and comprising fibres and fully cured resin will be able to maintain the resin transport transversely the connection between the edges of the elements 8 and the mould 4. It has been found that a composite consisting of a cured glass fibre-reinforced grid or other open structure provides a particularly advantageous structure for a surface spacer element, as the glass fibres are very affordable and relatively thick. In a particularly preferred embodiment, the cured grid is an open biax structure. The grid may advantageously be oriented relative to the edges of the cured fibre-reinforced sheet material so that the edges are not parallel to any of the biax directions as this reduces the likelihood of accidental blockage of resin transport under the edges via the surface spacer element.

In addition to facilitating resin transport, the surface spacer material may also contribute to the mechanical strength of the composite structure, particularly with respect to the strength orthogonal to the main direction of the reinforcement fibres of the cured fibre-reinforced sheet material. This is mainly due to the fact that the fibres of the surface spacer material typically are positioned in a non-parallel arrangement relative to the main direction of the reinforcement fibres of the cured fibre-reinforced sheet material. Typical and preferred orientation of a biax surface spacer material is ±45° relative to the main direction of the reinforcement fibres of the cured fibre-reinforced sheet material.

Figure 8:
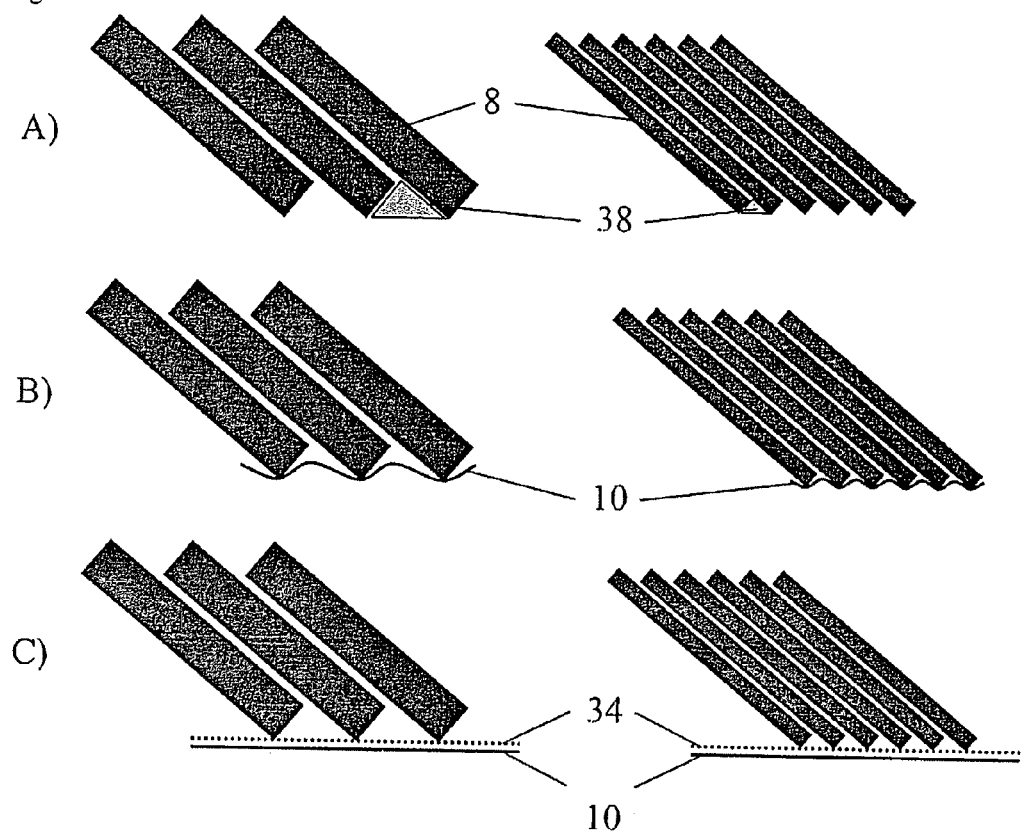
FIG. 8 shows effect of the thickness of the element of cured fibre-reinforced sheet material.

The flexibility of the element 8 decreases as the thickness of the element is increased. Furthermore, the steps between the edges of the individual element increase as the thickness of the elements are increased. This is illustrated in FIG. 8, where a stack of partially overlapping elements 8 of cured fibre-reinforced sheet material is schematically shown. In FIG. 8A, two stacks are shown, the stack to the left having thick elements 8 and the stack to the right having thin elements 8. It is observed that the triangular space 38 between the elements and an outer mould is larger for the thick elements 8 than for the thin elements 8. This may lead to a wavy outer surface texture of completed wind turbine blade shell member as shown in FIG. 8B, e.g. due to curing shrinkage of the resin or thermal contraction based on differences in thermal expansion and/or flexibility of the resin filling the triangular spaces 38 and other elements in the completed composite structure.

In FIG. 8C, it is illustrated how a cured material, such as a surface spacer element 34 as described above, may diminish or remove the tendency to form a wavy outer surface texture by decreasing the dependency of the surface characteristics on the properties of the resin and the thickness of the elements.

In a preferred embodiment, the plurality of elements of cured fibre-reinforced sheet material comprises at least two types of fibres. The fibres are preferably selected from the group consisting of carbon fibres, glass fibres, aramid fibres and natural fibres, such as cellulose-based fibres, preferably wood fibres.

The fibres may be arranged so that one or more of the elements comprises two or more types of fibres, such as e.g. a combination of carbon fibres with wood fibres or carbon fibres with glass fibres. In a particularly preferred embodiment, the plurality of elements comprises a first group of elements, which has a first fibre composition, and a second group of elements, which has a second composition. Preferably, the first fibre composition consists substantially of carbon fibres so that the first group of elements is particularly stiff relative to the weight and volume of the cured fibre-reinforced sheet material. The second fibre composition may e.g. comprise wood fibres and/or glass fibres. More than two groups of elements may be present, such as three, four, five, six or even more groups.

In one embodiment of the invention, the shape of the elements is similar for all elements irrespective of the group it belongs to. In another embodiment, the shapes of elements that belong to different groups are dissimilar. In a third embodiment, the shape of elements varies within an individual group of elements.

Preferred combinations of elements are
a) a group of elements reinforced by carbon fibres in combination with a group of elements reinforced by glass fibres;
b) a group of elements reinforced by carbon fibres in combination with a group of elements reinforced by wood fibres;
c) a group of elements reinforced by carbon fibres in combination with a group of elements reinforced by glass fibres and a group of elements reinforced by wood fibres.

These groups are particularly useful for manufacturing of elements for wind turbine blade shells, as the reinforcement requirements including stiffness and strength requirements vary with the distance from the blade root. A combination of this type utilising the cured fibre-reinforced sheet material technology according to the present invention will therefore provide a structurally superior and affordable blade.

Figure 9:
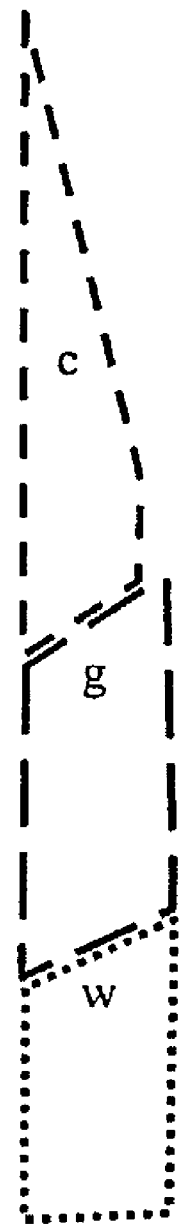
FIG. 9 shows arrangements of groups of elements.
Figure 9:
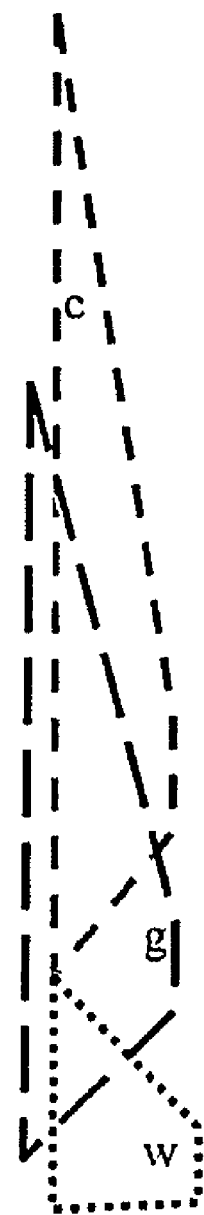

The elements of the groups may be positioned in the mould or the final product so that at least some of the elements of two groups are arranged end to end as illustrated in FIG. 9A. Here, 'c' indicates elements of cured fibre-reinforced sheet material mainly reinforced by carbon fibre, 'g' indicates elements of cured fibre-reinforced sheet material mainly reinforced by glass fibres, and 'w' indicates elements of cured fibre-reinforced sheet material mainly reinforced by wood fibres. Only one layer of elements is shown to enhance clarity. In fact may layers will be used for a composite structure, typically each layer is slightly displaced relative to adjacent layers, e.g. as illustrated in FIG. 4 to allow for more gradual changing of properties.

In FIG. 9B, another preferred arrangement of groups of elements is illustrated. Here, elements of the different groups partially overlap adjacent groups. The overlapping may cover only a small fraction of the area of an element or be a substantially complete overlap. It is preferred that the width of the element in overlapping areas are gradually reduced to provide more gradual change in properties of the overall reinforcement structure. The number of elements need not be the same for all groups. For example are fewer elements with carbon fibres than elements with wood fibres or glass fibre typically required, as elements with carbon fibre are stiffer than the other and typically are arranged in narrow part of the structure.

An individual feature or combination of features from an embodiment of the invention described herein, as well as obvious variations thereof, is combinable with or exchangeable for features of the other embodiments described herein, unless the person skilled in the art would immediately realise that the resulting embodiment is not physically feasible.

TABLE OF IDENTIFICATION

| | |
|---|---|
| 2 | Wind turbine blade shell member |
| 4 | Mould |
| 5 | Second mould part |
| 6 | Cured fibre-reinforced sheet material |
| 8 | Element of cured fibre-reinforced sheet material |
| 9 | Edge of element of cured fibre-reinforced sheet material |
| 10 | Outer surface layer material |
| 12 | Inner surface layer material |
| 14 | Layer of partially overlapping elements |
| 16 | Fraction of outermost part |
| 18 | Centre line |
| 20 | First sheet edge |
| 22 | Second sheet edge |
| 24 | First tip end |
| 26 | Second tip end |
| 30 | Template means |
| 32 | Inner spacer element |
| 34 | Surface spacer element |
| 36 | Core element |
| 38 | Triangular space |
| 40 | Maximum width |
| 42 | Dividing line |
| 43 | Resin passage |
| 44 | Resin inlet |
| 46 | Resin outlet |
| 50 | Spacing at convex side |
| 52 | Spacing at concave side |
| α | First tip angle |
| β | Second tip angle |

The invention claimed is:

1. A method of manufacturing a wind turbine blade shell member comprising the steps of:
providing a mould;
positioning a plurality of elements of cured fibre-reinforced sheet material in the mould, wherein at least some of the elements of cured fibre-reinforced sheet material are positioned as partially overlapping tiles so that a number of substantially parallel element edges are provided;
optionally providing at least one of an outer surface layer material and an inner surface layer material in the mould;
introducing a curable resin between substantially all of the elements of cured fibre-reinforced sheet material; and
bonding the plurality of elements of cured fibre-reinforced sheet material by curing the resin.

2. The method according to claim 1, wherein the substantially parallel element edges are substantially parallel to the length of the elements of cured fibre-reinforced sheet material.

3. The method according to claim 2, wherein at least two layers of elements of cured fibre-reinforced sheet material are positioned as partially overlapping elements.

4. The method according to claim 3, wherein resin is introduced in one operation to all layers of elements of cured fibre-reinforced sheet material positioned as partially overlapping elements.

5. The method according to claim 3, wherein resin is introduced in a first layer of elements of cured fibre-reinforced sheet material positioned as partially overlapping elements prior to introduction of resin into a further layer of elements of cured fibre-reinforced sheet material positioned as partially overlapping elements.

6. The method according to claim 5, wherein the resin introduced into the first layer of elements is cured prior to introduction of resin into the further layer of elements.

7. The method according to claim 1, wherein elements of cured fibre-reinforced sheet material are positioned along at least 75% of the length of the wind turbine blade shell member.

8. The method according to claim 1, wherein the cured fibre-reinforced sheet material comprises glass fibres and/or carbon fibres and/or wood fibres and a thermosetting resin.

9. The method according to claim 8, wherein the cured fibre-reinforced sheet material comprises mainly unidirectional fibres.

10. The method according to claim 9, wherein the unidirectional fibres are oriented parallel to the length of the cured fibre-reinforced sheet material.

11. The method according to claim 8, wherein the cured fibre-reinforced sheet material consists of carbon fibres and an epoxy based thermosetting resin.

12. The method according to claim 1, wherein the cured fibre-reinforced sheet material is coilable.

13. The method according to claim 12, wherein the cured fibre-reinforced sheet material has a thickness of between 0.5 mm to 3.0 mm that allows the cured fibre-reinforced sheet material to be coiled onto a roll with a diameter of less than 2 m.

14. The method according to claim 1, wherein the width of the cured fibre-reinforced sheet material is more than 100 mm.

15. The method according to claim 1, wherein the width of the cured fibre-reinforced sheet material is less than 500 mm.

16. The method according to claim 1, wherein the cured fibre-reinforced sheet material is provided with a surface texture to facilitate introduction of resin between adjacent elements of cured fibre-reinforced sheet material.

17. The method according to claim 16, wherein the cured fibre-reinforced sheet material is provided with surface resin protrusions of a height above a main surface of the cured fibre-reinforced sheet material of about 0.1 mm to 0.5 mm, and/or recesses of a depth below the main surface of about 0.1 mm to 0.5 mm.

18. The method according to claim 1, wherein the cured fibre-reinforced sheet material is sandblast and/or rinsed and dried before positioning in the mould.

19. The method according to claim 1, wherein the cured fibre-reinforced sheet material is a cured pultruded composite or a cured belt pressed composite.

20. The method according to claim 19, wherein the surface texture to facilitate introduction of resin between adjacent elements of cured fibre-reinforced sheet material at least partially is provided during manufacturing of the cured fibre-reinforced sheet material by belt pressing with a belt press.

21. The method according to claim 20, wherein the surface texture to facilitate introduction of resin is provided by at least one of a texture of a belt used in the belt press and a texture of a foil provided between the belt and the fibre-reinforced sheet material being formed by the belt press.

22. The method according to claim 1, further comprising the step of dividing the cured fibre-reinforced sheet material into elements of cured fibre-reinforced sheet material by cutting.

23. The method according to claim 22, wherein the cutting is performed by a water jet.

24. The method according to claim 1, wherein at least one of the elements of the cured fibre-reinforced sheet material is divided to form a first tip angle towards a first end corresponding to a first end of the wind turbine blade shell member, the first tip angle being formed by dividing the cured fibre-reinforced sheet material along a straight line from a first sheet edge to a second sheet edge of the cured fibre-reinforced sheet material.

25. The method according to claim 24, wherein at least one of the elements of the cured fibre-reinforced sheet material is divided to form a second tip angle towards a second end corresponding to a second end of the wind turbine blade shell member, the second tip angle being larger that the first tip angle ($\alpha$), and the second tip angle being formed by dividing the cured fibre-reinforced sheet material along a straight line from a first sheet edge to the second sheet edge of the cured fibre-reinforced sheet material.

26. The method according to claim 25, wherein the width of a part of the element of the cured fibre-reinforced sheet material corresponds to the width of the cured fibre-reinforced sheet material.

27. The method according to claim 1, wherein the element of the cured fibre-reinforced sheet material is trapezium-shaped or triangular with a height corresponding to a width of the cured fibre-reinforced sheet material.

28. The method according to claim 1, wherein at least some of the elements of cured fibre-reinforced sheet material are positioned in the mould according to a template means.

29. The method according to claim 28, wherein the template means is integrated in the wind turbine blade shell member.

30. The method according to claim 28, wherein the template means is a solid member having an outer edge indicating the relative position of elements of the cured fibre-reinforced sheet material towards an end of the wind turbine blade shell member and/or indicating the position of at least one element relative to the mould.

31. The method according to claim 1, further comprising the step of at least temporarily fixing the elements of cured fibre-reinforced sheet material to the mould and/or to another element in the mould.

32. The method according to claim 31, wherein the elements are fixed to the mould with a hot melt resin adhesive.

33. The method according to claim 31, wherein the elements are fixed to the mould with a mechanical fastening means.

34. The method according to claim 1, wherein the elements of the cured fibre-reinforced sheet material are positioned in the mould so as to form an overall reinforcement structure, which has at least two legs towards a first end corresponding to a first end of the wind turbine blade shell member and/or at least two legs towards a second end corresponding to the second end of the wind turbine blade shell member.

35. The method according to claim 34, wherein the elements of the cured fibre-reinforced sheet material are positioned in the mould so as to form an overall reinforcement structure, which has at least one more leg towards the second end of the wind turbine blade shell member than towards the first end of the wind turbine blade shell member.

36. The method according to claim 34, wherein at least some of the elements of the cured fibre-reinforced sheet material belonging to different legs towards at least one of the ends are interlaced.

37. The method according to claim 34, wherein the width and/or thickness of at least some of the elements of the cured fibre-reinforced sheet material are reduced in sections having overlapping legs.

38. The method according to claim 1, wherein a plurality of inner spacer elements is provided between adjacent elements of the cured fibre-reinforced sheet material to facilitate distribution of resin between said adjacent elements during the introduction of resin, the inner spacer elements being selected from one or more members of the group consisting of: a collection of fibres, such as glass fibres and/or carbon fibres; a solid material, such as sand particles; and a high melting point polymer.

39. The method according to claim 1, further comprising the step of providing a surface spacer element near a sheet edge of the element of the cured fibre-reinforced sheet material to facilitate distribution of resin transversely to the sheet edge of the element of the cured fibre-reinforced sheet material during resin introduction, wherein the surface spacer element is a fully cured fibre-reinforced polymer and the surface spacer element has an open structure to allow for resin migration without collapsing under pressure from the sheet edge of the element of the cured fibre-reinforced sheet material.

40. The method according to claim 39, wherein the surface spacer element is a cured grid structure.

41. The method according to claim 40, wherein the surface spacer element is a cured glass fibre composite grid structure.

42. The method according to claim 1, further comprising the steps of:
   forming a vacuum enclosure around the wind turbine blade shell member; and
   providing a vacuum in the vacuum enclosure so that the resin may be introduced by a vacuum assisted process, such as vacuum assisted resin transfer moulding, VARTM.

43. The method according to claim 42 for manufacturing of a wind turbine blade shell member, wherein resin is introduced through the flexible second mould part and via a resin passage to near the surface of the mould.

44. The method according to claim 43, where air that is being replaced by resin and/or excess resin is extracted near both leading edge and trailing edge.

45. The method according to claim 43, wherein the resin passage is arranged in a core element near the element of the cured fibre-reinforced sheet material, which element is nearest to the trailing edge.

46. The method according to claim 42, wherein the vacuum enclosure is formed by providing a flexible second mould part in vacuum tight communication with the mould.

47. The method according to claim 1, wherein the curable resin mainly is introduced between adjacent elements of the cured fibre-reinforced sheet material from near the mould surface.

48. The method of claim 1 further comprising manufacturing a wind turbine blade comprising the steps of connecting two blade shells, each blade shell comprising at least one of said wind turbine blade shell members.

49. The method according to claim 1, wherein the plurality of elements of cured fibre-reinforced sheet material comprises at least two types of fibres selected from the group consisting of carbon fibres, glass fibres and cellulose fibres.

* * * * *

UNITED STATES PATENT AND TRADEMARK OFFICE
CERTIFICATE OF CORRECTION

PATENT NO. : 8,047,798 B2
APPLICATION NO. : 11/883738
DATED : November 1, 2011
INVENTOR(S) : Anton Bech It is certified that error appears in the above-identified patent and that said Letters Patent is hereby corrected as shown below:

In the Specification:

At column 1, line approx. 44, "of the resin An outer" should read --of the resin. An outer--

At column 1, lines approx. 51-52, "Typically, more at least 3 elements are used," should read --Typically, more than at least 3 elements are used,--

At column 1, line approx. 62, "to each other form a loose stack." should read --to each other to form a loose stack.--

At column 1, lines approx. 65-66, "bending or . . . gently degrade the" should read --bending or . . . gently degrades the--

At column 2, lines approx. 25-26, "parallel element edges are edges, which are" should read --parallel element edges are edges which are--

At column 2, line approx. 62, "sheet material consist" should read --sheet material consists--

At column 3, lines approx. 50-51, "Examples of . . . is" should read --Examples of . . . are--

At column 4, line 1, "the space between . . . are subjected" should read --the space between . . . is subjected--

At column 4, line approx. 31, "of the belt press In another" should read --of the belt press. In another--

At column 4, lines approx. 62-63, "with the mould Thereafter" should read --with the mould. Thereafter--

At column 5, line approx. 43, "length of the blade Preferably the" should read --length of the Signed and Sealed this
Twenty-fifth Day of March, 2014

Michelle K. Lee
*Deputy Director of the United States Patent and Trademark Office*

CERTIFICATE OF CORRECTION (continued)
U.S. Pat. No. 8,047,798 B2 blade. Preferably the--

At column 6, lines approx. 26-27, "elements 8 of . . . is positioned in" should read --elements 8 of . . . are positioned in--

At column 6, line approx. 37, "member, An inner surface" should read --member. An inner surface--

At column 6, lines approx. 63-64, "upon which the resin in . . . are cured" should read --upon which the resin in . . . is cured--

At column 8, line approx. 14, "shell member 2 In a more preferred" should read --shell member 2. In a more preferred--

At column 8, line approx. 19, "sheetedge 22 of the" should read --sheet edge 22 of the--

At column 9, line approx. 5, "FIG. 4B to D illustrate" should read --FIGS. 4B to D illustrate--

At column 9, line approx. 8, "second end In" should read --second end. In--

At column 9, line approx. 12, "in addition to provide tensile" should read --in addition to providing tensile--

At column 9, line approx. 22, "Such interlacing are particularly easy" should read --Such interlacing is particularly easy--

At column 12, lines approx. 54-55, "In fact may layers will be used for" should read --In fact many layers will be used for--

At column 12, lines approx. 63-64, "width of . . . are gradually reduced to" should read --width of . . . is gradually reduced to--

At column 12, last line, to Col. 13, line 4, "For example are fewer elements with carbon fibres than elements with wood fibres or glass fibre typically required, as elements with carbon fibre are stiffer than the other and typically are arranged in narrow part of the structure" should read --For example fewer elements with carbon fibres than elements with wood fibres or glass fibres are typically required, as elements with carbon fibres are stiffer than than the other and typically are arranged in a narrow part of the structure--

In the Claims:

At column 14, line 49, Claim 18, "sheet material is sandblast and/or rinsed and dried before" should read --sheet material is sandblasted and/or rinsed and dried before--

At column 15, line 14, Claim 25, change "that" to --than--